(12) United States Patent
Yao et al.

(10) Patent No.: US 11,529,971 B2
(45) Date of Patent: Dec. 20, 2022

(54) METHOD AND APPARATUS FOR AUTONOMOUS DRIVING CONTROL, ELECTRONIC DEVICE, AND STORAGE MEDIUM

(71) Applicant: APOLLO INTELLIGENT DRIVING TECHNOLOGY (BEIJING) CO., LTD., Beijing (CN)

(72) Inventors: Dongchun Yao, Beijing (CN); Leibing Lv, Beijing (CN); Jingjing Xue, Beijing (CN); Fan Zhu, Beijing (CN)

(73) Assignee: APOLLO INTELLIGENT DRIVING TECHNOLOGY (BEIJING) CO., LTD.

( * ) Notice: Subject to any disclaimer, the term of this patent is extended or adjusted under 35 U.S.C. 154(b) by 88 days.

(21) Appl. No.: 16/911,516

(22) Filed: Jun. 25, 2020

(65) Prior Publication Data
US 2021/0094578 A1  Apr. 1, 2021

(30) Foreign Application Priority Data
Sep. 30, 2019 (CN) .......................... 201910944865.6

(51) Int. Cl.
*B60W 60/00* (2020.01)

(52) U.S. Cl.
CPC .. *B60W 60/0017* (2020.02); *B60W 60/00272* (2020.02); *B60W 2420/42* (2013.01);
(Continued)

(58) Field of Classification Search
CPC ....... B60W 60/0017; B60W 60/00272; B60W 2554/4029; B60W 2554/404; B60W 2420/42
See application file for complete search history.

(56) References Cited

U.S. PATENT DOCUMENTS

2017/0345164 A1*  11/2017  Guerreiro ............... B60R 11/04
2018/0162388 A1*  6/2018  You ........................ B60W 30/09
(Continued)

FOREIGN PATENT DOCUMENTS

CN         103942359 A       7/2014
CN         104331902 A       2/2015
(Continued)

OTHER PUBLICATIONS

First Office Action in CN Patent Application No. 201910944865.6 dated Sep. 23, 2021.
(Continued)

*Primary Examiner* — Anne Marie Antonucci
*Assistant Examiner* — Jingli Wang
(74) *Attorney, Agent, or Firm* — Dilworth IP, LLC (57) ABSTRACT

The present application discloses a method and an apparatus for autonomous driving control, an electronic device, and a storage medium; the application relates to the technical field of autonomous driving. A specific implementation solution is: obtaining movement data of a pedestrian, where the movement data includes a velocity component of the pedestrian along a width direction of a lane and a time of duration that the pedestrian cuts into a driving path of the autonomous vehicle from one side; determining a movement direction of the pedestrian according to the movement data and the movement information of the pedestrian; and generating a driving strategy for the autonomous vehicle according to the movement direction of the pedestrian. Therefore, the movement direction of the pedestrian can be accurately predicted, which facilitates the autonomous vehicle to avoid the pedestrian and insures driving safety.

14 Claims, 3 Drawing Sheets

(52) U.S. Cl.
CPC .............. *B60W 2554/404* (2020.02); *B60W 2554/4029* (2020.02)

(56) References Cited

U.S. PATENT DOCUMENTS

| | | | | |
|---|---|---|---|---|
| 2019/0108753 A1* | 4/2019 | Kaiser | ............... | G08G 1/0141 |
| 2019/0283749 A1 | 9/2019 | Shalev-Shwartz et al. | | |
| 2020/0307563 A1* | 10/2020 | Ghafarianzadeh | ........................ | B60W 60/00276 |

FOREIGN PATENT DOCUMENTS

| | | | |
|---|---|---|---|
| CN | 105151043 | A | 12/2015 |
| CN | 105300390 | A | 2/2016 |
| CN | 105628026 | A | 6/2016 |
| CN | 105809130 | A | 7/2016 |
| CN | 106428000 | A | 2/2017 |
| CN | 107239747 | A | 10/2017 |
| CN | 107544067 | A | 1/2018 |
| CN | 107705550 | A | 2/2018 |
| CN | 107749987 | A | 3/2018 |
| CN | 108614267 | A | 10/2018 |
| CN | 109278757 | A | 1/2019 |
| CN | 109508826 | A | 3/2019 |
| CN | 109643116 | A | 4/2019 |
| CN | 109878512 | A | 6/2019 |
| CN | 109969172 | A | 7/2019 |
| CN | 110095770 | A | 8/2019 |
| CN | 110288847 | A | 9/2019 |
| JP | H10105891 | A | 4/1998 |
| JP | 2011248445 | A | 12/2011 |
| JP | 2012513651 | A | 6/2012 |
| JP | 2013120574 | A | 6/2013 |
| JP | 2016192164 | A | 11/2016 |
| JP | 2019087139 | A | 6/2019 |
| JP | 2019533609 | A | 11/2019 |
| JP | 2020516971 | A | 6/2020 |
| JP | 2021504812 | A | 2/2021 |
| WO | 2013042260 | A1 | 3/2013 |
| WO | 2017090097 | A1 | 6/2017 |

OTHER PUBLICATIONS

European Search Report in EP Patent Application No. 20165534.7 dated Sep. 16, 2020.
Office Action in JP Patent Application No. 2020048113 dated May 18, 2021.
Second Office Action in CN Patent Application No. 201910944865.6 dated Mar. 9, 2022, 13 pages.

* cited by examiner

METHOD AND APPARATUS FOR
AUTONOMOUS DRIVING CONTROL,
ELECTRONIC DEVICE, AND STORAGE
MEDIUM

CROSS-REFERENCE TO RELATED APPLICATION

This application claims priority to Chinese Patent Application No. 201910944865.6, filed on Sep. 30, 2019, which is hereby incorporated by reference in its entirety.

TECHNICAL FIELD

The present application relates to autonomous driving technology in the field of data processing technology and, in particular, to a method and an apparatus for autonomous driving control, an electronic device, and a storage medium.

BACKGROUND

During a driving process of an autonomous vehicle, a driving path is planned for the autonomous vehicle so that the autonomous vehicle can travel according to the driving path. However, in the actual driving process of the autonomous vehicle, pedestrians often appear, and the movement of the pedestrians will affect the driving of autonomous vehicle; therefore, it is necessary to predict a movement trajectory of the pedestrian to enable the autonomous vehicle to avoid the pedestrian and insure the safety of both the pedestrian and autonomous vehicle.

In the prior art, when prediction is conducted on the movement trajectory of a pedestrian, heading information and velocity information of the pedestrian are often used to predict the movement of the pedestrian and obtain the movement trajectory of the pedestrian.

However, in the prior art, since the heading of the pedestrian may change suddenly, that is, the heading of the pedestrian may change instantaneously, which thus affects the prediction for movement of the pedestrian. As a result, it is impossible to accurately predict the movement of the pedestrian, making the autonomous vehicle unable to adjust its driving strategy in a timely manner, thereby resulting in a safety accident.

SUMMARY

The present application provides a method and an apparatus for autonomous driving control, an electronic device and a storage medium, which can accurately predict the movement direction of a pedestrian, facilitate an autonomous vehicle to avoid the pedestrian, and insure driving safety.

In a first aspect, an embodiment of the present application provides a method for autonomous driving control, including:

obtaining movement data of a pedestrian; where the movement data includes: a velocity component of the pedestrian along a width direction of a lane and a time of duration that the pedestrian cuts into a driving path of an autonomous vehicle from one side;

determining a movement direction of the pedestrian according to the movement data and movement information of the pedestrian; and generating a driving strategy for the autonomous vehicle according to the movement direction of the pedestrian.

In the present embodiment, a movement direction of the pedestrian is determined through obtaining a velocity component of the pedestrian along the width direction of the lane, the time of duration that the pedestrian cuts into a driving path of the autonomous vehicle from the one side and movement information of the pedestrian; the driving strategy for the autonomous vehicle is generated according to the movement direction of the pedestrian. Therefore, it is possible to perform an accurate prediction for an instantaneous movement direction of the pedestrian and determine whether the pedestrian will cut into the driving trajectory of the autonomous vehicle from the one side, which facilitates the autonomous vehicle to choose a better driving strategy, to avoid the pedestrian, and to insure driving safety.

In a possible design, the obtaining movement data of a pedestrian includes:

obtaining a position of the lane where the pedestrian is located and a movement velocity of the pedestrian;

resolving the movement velocity of the pedestrian in accordance to an extension direction and a width direction of the lane to obtain a velocity component along the extension direction of the lane and a velocity component along the width direction of the lane; and determining the time of duration that the pedestrian cuts into the driving path of the autonomous vehicle from the one side according to the velocity component of the pedestrian along the width direction of the lane and the position of the lane where the pedestrian is located.

In this embodiment, by resolving the movement velocity of the pedestrian, the velocity component of the pedestrian along the extension direction of the lane and the velocity component of the pedestrian along the width direction of the lane are obtained; then, based on the position of the lane where the pedestrian is located, it is possible to accurately calculate the time of duration that the pedestrian cuts into the driving path of the autonomous vehicle from the one side. According to this time of duration, it is possible to determine the likelihood that the pedestrian will cut into the driving trajectory of the autonomous vehicle, thereby enabling the autonomous vehicle to make a better avoidance strategy and insuring driving safety.

In a possible design, the obtaining a position of the lane where the pedestrian is located includes:

capturing an environmental image of surroundings of the autonomous vehicle;

extracting lane information from the environmental image, where the lane information includes: positions of lane distribution, a lane width, and a lane direction; and determining the position of the lane where the pedestrian is located according to the lane information.

In this embodiment, the environmental image of the surroundings of the autonomous vehicle can be collected with an image collector (such as a camera) installed on the autonomous vehicle. Then, positions of lane distribution, a lane width, a lane direction, and other information are extracted from the environmental image. With a combination of such information and the position where the pedestrian appears in the image, the position of the lane where the pedestrian is located is determined. Thereby, accurate positioning of the pedestrian can be realized, which facilitates the collection of the movement information of the pedestrian.

In a possible design, the determining a time of duration that the pedestrian cuts into the driving path of the autonomous vehicle from one side according to the velocity component of the pedestrian along the width direction of the lane and the position of the lane where the pedestrian is located includes:

obtaining velocity components of the pedestrian along the width direction of the lane corresponding to multiple moments within a preset time period;

performing a smoothing processing on the velocity components of the pedestrian along the width direction of the lane corresponding to the multiple moments to obtain a smoothing processed velocity component; and determining the time of duration that the pedestrian cuts into the driving path of the autonomous vehicle from the one side according to the smoothing processed velocity component and the position of the lane where the pedestrian is located.

In the present embodiment, the smoothing processing is performed on the velocity components of the pedestrian along the width direction of the lane at the multiple moments in the preset time period to obtain the smoothing processed velocity component; then the time of duration that the pedestrian cuts into the driving path of the autonomous vehicle from the one side is determined according to the smoothing processed velocity component and the position of the lane where the pedestrian is located. In this way, it is possible to eliminate the disturbance caused by a body sway from left to right of the pedestrian within a preset period of time, making the collected information more accurate.

In a possible design, the movement information of the pedestrian includes: an average velocity of the pedestrian in the time of duration, a distance between the pedestrian and the autonomous vehicle, and a standard deviation of the movement velocity of the pedestrian.

In this embodiment, sufficient movement information of the pedestrian is obtained and then used as a basis for the decision so as to make the driving strategy generated by the autonomous vehicle more consistent with the actual road conditions and improve the effectiveness of the control strategy on the premise that driving safety is insured.

In a possible design, the following step is further included.

controlling driving of the autonomous vehicle according to the driving strategy.

In the present embodiment, the driving strategy may be a deceleration strategy, a lane changing strategy, an acceleration strategy, and the like. For example, when a pedestrian has already cut into the driving path of the autonomous vehicle and there are vehicles in other lanes, the deceleration strategy is adopted. When the distance between the pedestrian and the vehicle is long, and the pedestrian has not yet cut into the driving path of the autonomous vehicle, the acceleration strategy is adopted. Thereby, the pedestrian can be avoided according to the movement direction of pedestrian, and the safety of autonomous vehicle and the pedestrian can be insured.

In a possible design, the determining a movement direction of the pedestrian according to the movement data and movement information of the pedestrian includes:

constructing a decision tree model, where the decision tree model includes: a gradient boosted decision tree (GBDT) model; and inputting the movement data and the movement information of the pedestrian into the decision tree model, where the decision tree model outputs the movement direction of the pedestrian; where the movement direction of the pedestrian includes: an extension direction of the lane, a leftward direction for cutting into the lane and a rightward direction for cutting into the lane.

In the present embodiment, classification of the movement direction of the pedestrian is performed through a constructed decision tree model, and the most likely movement direction of the pedestrian is determined based on the movement data and the movement information of the pedestrian. As many factors are introduced into the decision tree model, the determination result of the movement direction can be made more accurate.

In a possible design, the generating a driving strategy for the autonomous vehicle according to the movement direction of the pedestrian includes:

generating the driving strategy for the autonomous vehicle according to the movement direction of the pedestrian, where the driving strategy includes: adjustment of a driving velocity and adjustment of a driving direction.

In the present embodiment, after the moving direction of the pedestrian is determined, the driving velocity and/or driving direction of the autonomous vehicle can be adjusted to insure the safety of the autonomous vehicle and the pedestrian.

In a possible design, the following steps are further included:

determining an avoidance strategy for the autonomous vehicle according to the movement direction of the pedestrian, driving information of the autonomous vehicle and the movement information of the pedestrian; where the driving information of the autonomous vehicle includes: a driving velocity of the autonomous vehicle, information about a position of the lane where the autonomous vehicle is located, and a distance between the autonomous vehicle and the pedestrian; and controlling driving of the autonomous vehicle according to the avoidance strategy.

In the present embodiment, the avoidance strategy for the autonomous vehicle may be determined based on the comprehensive consideration of the movement direction of the pedestrian, driving information of the autonomous vehicle and the movement information of the pedestrian, so that on the premise of an insurance of the pedestrian safety and driving safety, the autonomous vehicle uses the best avoidance method and provides improved driving experience.

In a second aspect, an embodiment of the present application provides an apparatus for autonomous driving control, including:

an obtaining module, configured to obtain movement data of a pedestrian; where the movement data includes: a velocity component of the pedestrian along a width direction of a lane and a time of duration that the pedestrian cuts into a driving path of an autonomous vehicle from one side;

a determining module, configured to determine a movement direction of the pedestrian according to the movement data and movement information of the pedestrian; and a controlling module, configured to generate a driving strategy for the autonomous vehicle according to the movement direction of the pedestrian.

In the present embodiment, a movement direction of the pedestrian is determined through obtaining a velocity component of the pedestrian along the width direction of the lane, the time of duration that the pedestrian cuts into a driving path of the autonomous vehicle from the one side and movement information of the pedestrian; the driving strategy for the autonomous vehicle is generated according to the movement direction of the pedestrian. Therefore, it is possible to perform an accurate prediction for an instantaneous movement direction of the pedestrian and a determination of whether the pedestrian will cut into the driving trajectory of the autonomous vehicle from the one side, which facilitates the autonomous vehicle to choose a better driving strategy, to avoid the pedestrian, and to insure driving safety.

In a possible design, the obtaining module is specifically configured to:

obtain a position of the lane where the pedestrian is located and a movement velocity of the pedestrian;

resolve the movement velocity of the pedestrian in accordance to an extension direction and a width direction of the lane to obtain a velocity component along the extension direction of the lane and a velocity component along the width direction of the lane; and determine the time of duration that the pedestrian cuts into the driving path of the autonomous vehicle from the one side according to the velocity component of the pedestrian along the width direction of the lane and the position of the lane where the pedestrian is located.

In this embodiment, by resolving the movement velocity of the pedestrian, the velocity component of the pedestrian along the extension direction of the lane and the velocity component of the pedestrian along the width direction of the lane are obtained; then, based on the position of the lane where the pedestrian is located, it is possible to accurately calculate the time of duration that the pedestrian cuts into the driving path of the autonomous vehicle from the one side. According to this time of duration, it is possible to determine the likelihood that the pedestrian will cut into the driving trajectory of the autonomous vehicle, thereby enabling the autonomous vehicle to make a better avoidance strategy and insuring driving safety.

In a possible design, the obtaining module is further configured to:

capture an environmental image of surroundings of the autonomous vehicle;

extract lane information from the environmental image, where the lane information includes: positions of lane distribution, a lane width, and a lane direction; and determine the position of the lane where the pedestrian is located according to the lane information.

In this embodiment, the environmental image of the surroundings of the autonomous vehicle can be collected with an image collector (such as a camera) installed on the autonomous vehicle. Then, positions of lane distribution, a lane width, a lane direction, and other information are extracted from the environmental image. With a combination of such information and the position where the pedestrian appears in the image, the position of the lane where the pedestrian is located is determined. Thereby, accurate positioning of the pedestrian can be realized, which facilitates the collection of the movement information of the pedestrian.

In a possible design, determining a time of duration that the pedestrian cuts into the driving path of the autonomous vehicle from one side according to the velocity component of the pedestrian along the width direction of the lane and the position of the lane where the pedestrian is located includes:

obtaining velocity components of the pedestrian along the width direction of the lane corresponding to multiple moments within a preset time period;

performing a smoothing processing on the velocity components of the pedestrian along the width direction of the lane corresponding to the multiple moments to obtain a smoothing processed velocity component; and determining the time of duration that the pedestrian cuts into the driving path of the autonomous vehicle from the one side according to the smoothing processed velocity component and the position of the lane where the pedestrian is located.

In the present embodiment, the smoothing processing is performed on the velocity components of the pedestrian along the width direction of the lane at the multiple moments in the preset time period to obtain the smoothing processed velocity component; then the time of duration that the pedestrian cuts into the driving path of the autonomous vehicle from the one side is determined according to the smoothing processed velocity component and the position of the lane where the pedestrian is located. In this way, it is possible to eliminate the disturbance caused by a body sway from left to right of the pedestrian within a preset period of time, making the collected information more accurate.

In a possible design, the movement information of the pedestrian includes: an average velocity of the pedestrian in the time of duration, a distance between the pedestrian and the autonomous vehicle, and a standard deviation of the movement velocity of the pedestrian.

In this embodiment, sufficient movement information of the pedestrian is obtained and then used as a basis for the decision so as to make the driving strategy generated by the autonomous vehicle more consistent with the actual road conditions and improve the effectiveness of the control strategy on the premise that driving safety is insured.

In a possible design, the controlling module is further configured to:

control driving of the autonomous vehicle according to the driving strategy.

In the present embodiment, the driving strategy may be a deceleration strategy, a lane changing strategy, an acceleration strategy, and the like. For example, when a pedestrian has already cut into the driving path of the autonomous vehicle and there are vehicles in other lanes, the deceleration strategy is adopted. When the distance between the pedestrian and the vehicle is long, and the pedestrian has not yet cut into the driving path of the autonomous vehicle, the acceleration strategy is adopted. Thereby, the pedestrian can be avoided according to the movement direction of pedestrian, and the safety of autonomous vehicle and the pedestrian can be insured.

In a possible design, the determining module is specifically configured to:

construct a decision tree model, where the decision tree model includes: a gradient boosted decision tree (GBDT) model; and input the movement data and the movement information of the pedestrian into the decision tree model, where the decision tree model outputs the movement direction of the pedestrian; where the movement direction of the pedestrian includes: an extension direction of the lane, a leftward direction for cutting into the lane and a rightward direction for cutting into the lane.

In the present embodiment, classification of the movement direction of the pedestrian is performed through the constructed decision tree model, and the most likely movement direction of the pedestrian is determined based on the movement data and the movement information of the pedestrian. As many factors are introduced into the decision tree model, the determination result of the movement direction can be made more accurate.

In a possible design, the controlling module is specifically configured to:

generate the driving strategy for the autonomous vehicle according to the movement direction of the pedestrian, where the driving strategy includes: adjustment of a driving velocity and adjustment of a driving direction.

In the present embodiment, after the moving direction of the pedestrian is determined, the driving velocity and/or driving direction of the autonomous vehicle can be adjusted to insure the safety of the autonomous vehicle and the pedestrian.

In a possible design, the controlling module is further configured to:

determine an avoidance strategy for the autonomous vehicle according to the movement direction of the pedestrian, driving information of the autonomous vehicle and the movement information of the pedestrian; where the driving information of the autonomous vehicle includes: a driving velocity of the autonomous vehicle, information about a position of the lane where the autonomous vehicle is located, and a distance between the autonomous vehicle and the pedestrian; and control driving of the autonomous vehicle according to the avoidance strategy.

In the present embodiment, the avoidance strategy for the autonomous vehicle may be determined based on the comprehensive consideration of the movement direction of the pedestrian, driving information of the autonomous vehicle and the movement information of the pedestrian, so that on the premise of an insurance of the pedestrian safety and driving safety, the autonomous vehicle uses the best avoidance method and provides improved driving experience.

In a third aspect, the present application provides an electronic device including: a processor and a memory; the memory stores executable instructions of the processor; where the processor is configured to perform the method for autonomous driving control according to any one of the designs of the first aspect via executing the executable instructions.

In a fourth aspect, the present application provides a computer readable storage medium stored with a computer program that, when executed by a processor, implements the method for autonomous driving control according to any one of the designs of the first aspect.

In a fifth aspect, an embodiment of the present application provides a program product, the program product including a computer program stored in a readable storage medium, and at least one processor of a server may read the computer program from the readable storage medium, and execute the computer program to cause the server to perform the method for autonomous driving control according to any one of the designs of the first aspect.

In a sixth aspect, the present application further provides a method for autonomous driving control, including:

obtaining movement data of a pedestrian;

determining a movement direction of the pedestrian according to the movement data and movement information of the pedestrian; and generating a driving strategy for the autonomous vehicle according to the movement direction of the pedestrian.

In the present embodiment, by means of the steps of obtaining movement data of a pedestrian, determining a movement direction of the pedestrian according to the movement data and movement information of the pedestrian; and generating a driving strategy for the autonomous vehicle according to the movement direction of the pedestrian, the movement direction of the pedestrian can be accurately predicted, which facilitates the autonomous vehicle to avoid the pedestrian and insures driving safety.

The above described embodiment in application has the following advantages or beneficial effects: the movement direction of the pedestrian can be accurately predicted, which facilitates the autonomous vehicle to avoid the pedestrian and insures driving safety. Since adopting the technical means including obtaining the movement data of the pedestrian, determining a movement direction of the pedestrian according to the movement data and movement information of the pedestrian, and generating a driving strategy for the autonomous vehicle according to the movement direction of the pedestrian, the technical problem that the movement direction of a pedestrian cannot be accurately predicted is solved; and by means of an accurate prediction for the movement direction of the pedestrian, the technical effects of pedestrian avoidance by the autonomous vehicle and insurance of driving safety are achieved.

Other effects of the foregoing optional manners will be described below with reference to specific embodiments.

BRIEF DESCRIPTION OF DRAWINGS

The drawings are used for a better understanding the solution, and do not constitute a limitation on the application. Among the drawings.

DETAILED DESCRIPTION OF EMBODIMENTS

Exemplary embodiments of the present application are described as follows with reference to the accompanying drawings, which include various details of the embodiments of the present application to facilitate understanding and should be considered as merely exemplars. Therefore, those of ordinary skill in the art should realize that various changes and modifications can be made to the embodiments described herein without departing from the scope and spirit of the application. Also, for clarity and conciseness, descriptions of well-known functions and structures are omitted in the following description.

The terms "first", "second", "third", "fourth", etc. (if present) in the description, claims and the above drawings of the present application are used to distinguish similar objects, rather than necessarily used to describe a specific order or sequence. It should be understood that the data used in this way are interchangeable under appropriate circumstances so that the embodiments of the present application described herein can be implemented, for example, in an order other than those illustrated or described herein. Furthermore, the terms "including" and "having" and any of their variations are intended to cover non-exclusive inclusions. For example, a process, method, system, product, or device that contains a series of steps or units shall not be limited to those steps or units explicitly listed, and it may include steps or units that not explicitly listed or inherent to the process, method, product or device.

The technical solutions of the present application will be described in detail in the following specific embodiments. The following specific embodiments may be combined with each other, and the same or similar concepts or processes may not be repeated in some embodiments.

In view of the technical problem existed in the prior art, the present application provides a method and an apparatus for autonomous driving control, an electronic device and a storage medium, which can accurately predict the movement direction of a pedestrian, facilitate an autonomous vehicle to avoid the pedestrian, and insure driving safety.

Figure 1:
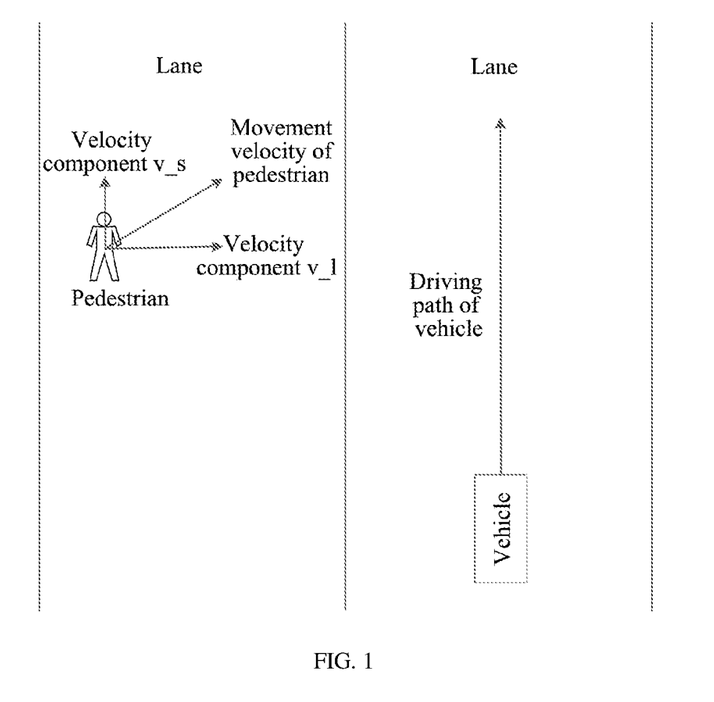
FIG. 1 is a diagram of a scenario in which a method for autonomous driving control according to an embodiment of the present application may be implemented.

FIG. 1 is a diagram of a scenario in which a method for autonomous driving control according to an embodiment of the present application may be implemented. As shown in FIG. 1, in the actual environment, the heading of a pedestrian may suddenly change, which affects a moving vehicle. In this case, a velocity component of the pedestrian along an extension direction of the lane is parallel to a driving direction of the vehicle and, thus, only affects the vehicle traveling in the same lane. However, a velocity component of the pedestrian along a width direction of the lane is perpendicular to the driving direction of the vehicle, indicates an intention of the pedestrian to cut into a driving path of the vehicle and, thus, has a greater impact on an autonomous vehicle. This application mainly considers the velocity component of a pedestrian along the width direction of the lane. The autonomous vehicle firstly obtains a position of the lane where the pedestrian is located and the movement velocity v of the pedestrian, and then resolves the movement velocity of the pedestrian along two directions of the lane to obtain a velocity component v_s and a velocity component v_l, where the velocity component v_s is a velocity component of the movement velocity of the pedestrian in the extension direction of the lane, while the velocity component v_l is a velocity component of the movement velocity of the pedestrian in the width direction of the lane. Then, according to the velocity component of the pedestrian along the width direction of the lane and the position of the lane where the pedestrian is located, the autonomous vehicle determines the time of duration that the pedestrian cuts into the driving path of the autonomous vehicle from the one side. According to this time of duration, it is possible to determine the likelihood that the pedestrian will cut into the driving trajectory of the autonomous vehicle. Then, the autonomous vehicle can classify the movement direction of the pedestrian through a constructed decision tree model, and determine the most likely movement direction of the pedestrian based on the movement data and the movement information of the pedestrian, thereby realizing an accurate prediction for an instantaneous movement direction of the pedestrian and a determination of whether the pedestrian will cut into the driving trajectory of the autonomous vehicle from the one side. Theoretically, the direction can also be determined through other classification models. As many factors are introduced into the decision tree model, the determination result of the movement direction can be made more accurate. After the moving direction of the pedestrian is determined, the driving velocity and/or driving direction of the autonomous vehicle can be adjusted to insure the safety of the autonomous vehicle and the pedestrian.

The application of the above method can solve the technical problem that the movement direction of a pedestrian cannot be accurately predicted; by means of an accurate prediction for the movement direction of the pedestrian, the technical effects of pedestrian avoidance by the autonomous vehicle and insurance of driving safety are achieved.

Figure 2:
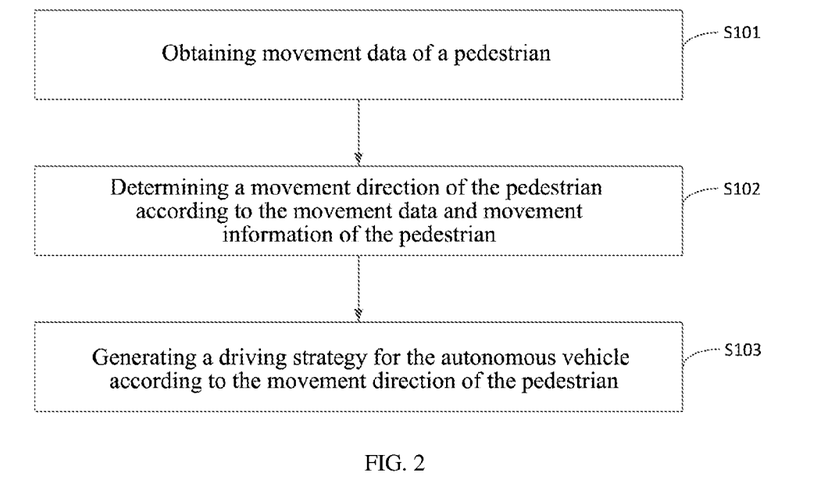
FIG. 2 is a schematic diagram of a first embodiment according to the present application.

FIG. 2 is a schematic diagram of a first embodiment according to the present application; as shown in FIG. 2, the method in this embodiment may include:

S101. Obtaining movement data of a pedestrian.

In this embodiment, an autonomous vehicle firstly obtains the movement data of the pedestrian, where the movement data includes: a velocity component of the pedestrian along a width direction of a lane, and a time of duration that the pedestrian cuts into a driving path of the autonomous vehicle from one side.

Specifically, in the actual environment, the heading of a pedestrian may suddenly change, which affects a moving vehicle. In this case, a velocity component of the pedestrian along an extension direction of the lane is parallel to a driving direction of the vehicle and, thus, only affects the vehicle traveling in the same lane. However, a velocity component of the pedestrian along a width direction of the lane is perpendicular to the driving direction of the vehicle, indicates an intention of the pedestrian to cut into a driving path of the vehicle and, thus, has a greater impact on an autonomous vehicle. This application mainly considers the velocity component of a pedestrian along the width direction of the lane. For example, in a case of on a three-lane road, an autonomous vehicle is driving in the middle lane while a pedestrian is in the rightmost lane, and when the velocity component of the pedestrian along the width direction of the lane is from right to left, the pedestrian will cut into the driving path of the autonomous vehicle, which affects the autonomous vehicle, thus it is necessary to adjust the velocity and direction of the vehicle. The time of duration that the pedestrian cuts into a driving path of the autonomous vehicle from one side refers to a time of duration of keeping the movement velocity for cutting into the driving path of the autonomous vehicle from one side non-zero, and it can be determined according to the velocity component of the pedestrian along the width direction of the lane and the position of the lane where the pedestrian is located. The specific determination method will be described in detail hereinafter, rather than given here. The time of duration that the pedestrian cuts into a driving path of the autonomous vehicle from one side indicates an intention of the pedestrian to cut into the driving path of the vehicle. For example, on the one hand, if the time of duration that the pedestrian cuts into the driving path of the autonomous vehicle from one side is very short, the pedestrian may be avoiding an obstacle and will not intrude into the driving path of the autonomous vehicle; on the other hand, the case where the time of duration that the pedestrian cuts into the driving path of the autonomous vehicle from one side exceeds a threshold indicates that the likelihood the pedestrian will intrude into the driving path of the autonomous vehicle is rather high, and the driving strategy needs to be adjusted to avoid the pedestrian. The present application mainly performs an accurate prediction for an instantaneous movement direction of the pedestrian and a determination of whether the pedestrian will cut into the driving trajectory of the autonomous vehicle from the one side, which facilitates the autonomous vehicle to choose a better driving strategy, to avoid the pedestrian, and to insure driving safety.

Optionally, the obtaining movement data of a pedestrian includes: obtaining a position of the lane where the pedestrian is located and a movement velocity of the pedestrian; resolving the movement velocity of the pedestrian in accordance to an extension direction and a width direction of the lane to obtain a velocity component along the extension direction of the lane and a velocity component along the width direction of the lane; and determining the time of duration that the pedestrian cuts into the driving path of the autonomous vehicle from the one side according to the velocity component of the pedestrian along the width direction of the lane and the position of the lane where the pedestrian is located.

Specifically, the autonomous vehicle firstly obtains the position of the lane where the pedestrian is located and the movement velocity of the pedestrian. Then, the autonomous vehicle resolves the velocity of the pedestrian into two directions of the lane.

Figure 3:
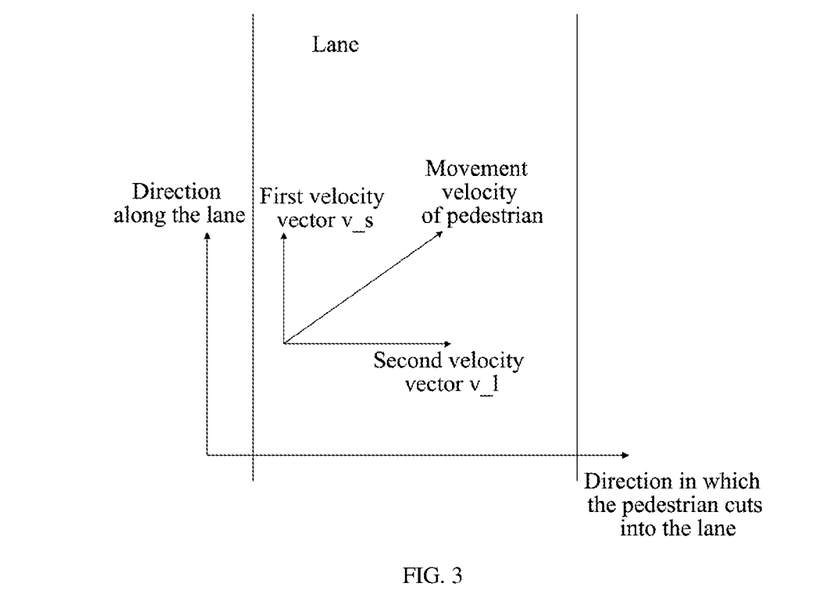
FIG. 3 is a schematic diagram of resolution of a movement velocity of a pedestrian according to the present application.

FIG. 3 is a schematic diagram of resolution of a movement velocity of a pedestrian according to the present application; as shown in FIG. 3, the two directions of the lane are the extension direction of the lane (the direction along the lane), and the width direction of the lane (the direction in which the pedestrian cuts into the lane); a first velocity vector v_s and a second velocity vector v_l are obtained, where the first velocity vector v_s is a velocity component of the movement velocity of the pedestrian in the extension direction of the lane, while the second velocity vector v_l is a velocity component of the movement velocity of the pedestrian in the width direction of the lane. Finally, according to the velocity component of the pedestrian along the width direction of the lane and the position of the lane where the pedestrian is located, the time of duration that the pedestrian cuts into the driving path of the autonomous vehicle from the one side is determined. According to this time of duration, it is possible to determine the likelihood that the pedestrian will cut into the driving trajectory of the autonomous vehicle, thereby enabling the autonomous vehicle to make a better avoidance strategy and insuring driving safety. For example, in a case of on a three-lane road, an autonomous vehicle is driving in the middle lane while a pedestrian is in the rightmost lane, the velocity of the pedestrian is resolved in accordance to the extension direction and the width direction of the lane. At moment t1, when the velocity component of the pedestrian along the width direction of the lane is from left to right, the pedestrian will not cut into the driving path of the autonomous vehicle. At moment t2, when the velocity component of the pedestrian along the width direction of the lane is from right to left, the pedestrian will cut into the driving path of the autonomous vehicle. Therefore, the time of duration that the pedestrian cuts into a driving path of the autonomous vehicle from one side is t2−t1.

It should be noted that this embodiment does not limit the manner that the autonomous vehicle obtains the position of the lane where the pedestrian is located, nor does it limit the manner that the autonomous vehicle obtains the velocity of the pedestrian, and those skilled in the art can reasonably select the obtaining manner according to the actual situation. For example, the position of the pedestrian and the position of the lane where the pedestrian is located can be obtained with an image sensor on a vehicle which captures an environmental image of the vehicle and performs image recognition on the environmental image. And the movement velocity of the pedestrian is obtained according to the comparison with the position of the pedestrian at a previous moment. Alternatively, the position of the lane where the pedestrian is located can be obtained with a position of the pedestrian relative to the vehicle, in combination with the road information in the map data, where the position of the pedestrian relative to the vehicle can be determined according to a vehicle radar. And the movement velocity of the pedestrian is obtained according to the comparison with the position of the pedestrian at a previous moment.

Optionally, obtaining the position of the lane where the pedestrian is located includes: capturing an environmental image of surroundings of the autonomous vehicle; extracting lane information from the environmental image, where the lane information includes: positions of lane distribution, a lane width, and a lane direction; and determining the position of the lane where the pedestrian is located according to the lane information.

Specifically, an autonomous vehicle can capture an environmental image of the surroundings of the vehicle with an image sensor (for example, a camera) on the vehicle, and perform image recognition on the environmental image to extract lane information such as positions of lane distribution, lane width, and lane direction. Then the position of the lane where the pedestrian is located is determined according to the lane information and the position of the pedestrian. Thereby, accurate positioning of the pedestrian can be realized, which facilitates the collection of the movement information of the pedestrian.

Optionally, determining a time of duration that the pedestrian cuts into the driving path of the autonomous vehicle from one side according to the velocity component of the pedestrian along the width direction of the lane and the position of the lane where the pedestrian is located includes: obtaining velocity components of the pedestrian along the width direction of the lane corresponding to multiple moments within a preset time period; performing a smoothing processing on the velocity components of the pedestrian along the width direction of the lane corresponding to the multiple moments to obtain a smoothing processed velocity component; and determining the time of duration that the pedestrian cuts into the driving path of the autonomous vehicle from the one side according to the smoothing processed velocity component and the position of the lane where the pedestrian is located.

Specifically, during the movement of a pedestrian, the body may sway from left to right or the travel path is not straight. In order to eliminate the disturbance caused by these factors, when the movement of the pedestrian is sampled, multiple velocity components of the pedestrian in a preset time period (for example, 1 second) along the width direction of the lane can be collected. Then, a smoothing processing is performed on the velocity components of the pedestrian along the width direction of the lane corresponding to the multiple moments to obtain a smoothing processed velocity component. For example, the existing smoothing filter may be used for the smoothing processing, or the smoothing processing may be performed in a manner of an exponential weighted average.

S102. Determining a movement direction of the pedestrian according to the movement data and movement information of the pedestrian.

In this embodiment, the movement information of the pedestrian includes: an average velocity of the pedestrian in the time of duration, a distance between the pedestrian and the autonomous vehicle, and a standard deviation of the movement velocity of the pedestrian. The autonomous vehicle can classify the movement direction of the pedestrian through a constructed decision tree model, and determine the most likely movement direction of the pedestrian based on the movement data and the movement information of the pedestrian. Theoretically, the direction can also be determined through other classification models. As many factors are introduced into the decision tree model, the determination result of the movement direction can be made more accurate.

Optionally, the determining a movement direction of the pedestrian according to the movement data and movement information of the pedestrian includes: constructing a decision tree model, where the decision tree model includes: a gradient boosted decision tree (GBDT) model; inputting the movement data and the movement information of the pedestrian into the decision tree model, where the decision tree model outputs the movement direction of the pedestrian; where the movement direction of the pedestrian includes: the extension direction of the lane, the leftward direction for cutting into the lane and the rightward direction for cutting into the lane.

Specifically, the gradient boosting decision tree (GBDT) model may be constructed, and movement data and movement information of the pedestrian are input into the decision tree model. The decision tree model makes a decision and outputs the movement direction of the pedestrian. The working principle of the decision tree is the prior art, which will not be repeated here.

S103. Generating a driving strategy for the autonomous vehicle according to the movement direction of the pedestrian.

In this embodiment, a driving strategy for the autonomous vehicle is generated according to the movement direction of the pedestrian, where the driving strategy includes: adjustment of a driving velocity and adjustment of a driving direction. For example, if it is determined in S102 that the movement direction of the pedestrian is the extension direction of the lane, the autonomous vehicle will not be affected, and then there is no need to adjust the driving velocity or the driving direction. If it is determined in S102 that the movement direction of the pedestrian is the leftward direction for cutting into the lane, the autonomous vehicle may be affected, and then the pedestrian can be avoided by slowing down, or changing to a lane in the left to stay away from the pedestrian. If it is determined in S102 that the movement direction of the pedestrian is the rightward direction for cutting into the lane, the autonomous vehicle may be affected, and then the pedestrian can be avoided by slowing down, or changing to a lane in the right to stay away from the pedestrian.

In the present embodiment, by means of the steps of obtaining movement data of the pedestrian, where the movement data includes a velocity component of the pedestrian along the width direction of the lane and the time of duration that the pedestrian cuts into a driving path of the autonomous vehicle from one side; determining a movement direction of the pedestrian according to the movement data and the movement information of the pedestrian; and generating the driving strategy for the autonomous vehicle according to the movement direction of the pedestrian, the movement direction of the pedestrian can be accurately predicted, which facilitates the autonomous vehicle to avoid the pedestrian and insures driving safety.

Figure 4:
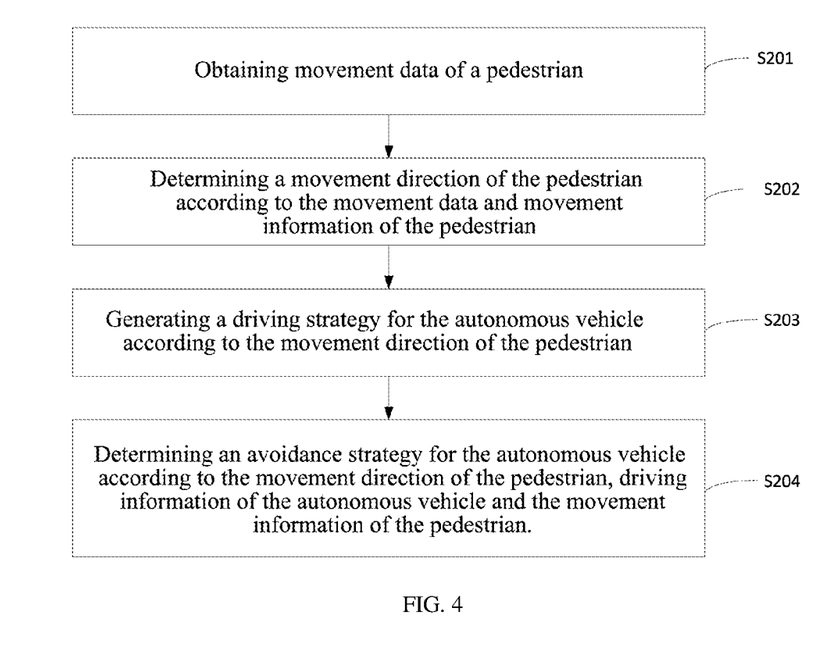
FIG. 4 is a schematic diagram of a second embodiment according to the present application.

FIG. 4 is a schematic diagram of a second embodiment according to the present application; as shown in FIG. 4, the method in this embodiment may include:

S201. Obtaining movement data of a pedestrian.

S202. Determining a movement direction of the pedestrian according to the movement data and movement information of the pedestrian.

S203. Generating a driving strategy for the autonomous vehicle according to the movement direction of the pedestrian.

For specific implementation processes and implementation principles of steps S201 to S203 in this embodiment, reference can be made to the related description of steps S101 to S103 shown in FIG. 2, and details thereof are not described herein again.

S204. Determining an avoidance strategy for the autonomous vehicle according to the movement direction of the pedestrian, driving information of the autonomous vehicle and the movement information of the pedestrian.

In this embodiment, the driving information of the autonomous vehicle includes: a driving velocity of the autonomous vehicle, information about a position of the lane where the autonomous vehicle is located, and a distance between the autonomous vehicle and the pedestrian.

Specifically, the time required for the vehicle to reach the position of the pedestrian can be calculated through the driving velocity of the autonomous vehicle and the distance between the autonomous vehicle and the pedestrian. Then, whether the pedestrian will intrude into the driving path of the vehicle is calculated according to the information about the position of the lane where the autonomous vehicle is located and the velocity component of the pedestrian in the width direction of the lane, so as to determine the avoidance strategy for the autonomous vehicle. For example, in a case where it is determined in S102 that the movement direction of the pedestrian is the leftward direction for cutting into the lane, the autonomous vehicle may be affected. If by calculations based on the movement direction of the pedestrian, driving information of the autonomous vehicle, and movement information of the pedestrian, it is determined that when the vehicle is passing the position of the pedestrian, the pedestrian has completed the road crossing, then the vehicle will not be affected, and driving strategy of the vehicle may not be adjusted. If by calculation, it is determined that when the vehicle is passing the position of the pedestrian, the pedestrian has already been on the left side of the path of the vehicle, and a control over the vehicle to change to a lane in the right can keep off the pedestrian, then it is determined that the avoidance strategy is changing to a lane in the right.

In the present embodiment, by means of the steps of obtaining movement data of the pedestrian, where the movement data includes a velocity component of the pedestrian along the width direction of the lane and the time of duration that the pedestrian cuts into a driving path of the autonomous vehicle from one side; determining a movement direction of the pedestrian according to the movement data and the movement information of the pedestrian; generating the driving strategy for the autonomous vehicle according to the movement direction of the pedestrian; and determining an avoidance strategy for the autonomous vehicle according to the movement direction of the pedestrian, driving information of the autonomous vehicle and the movement information of the pedestrian, the movement direction of the pedestrian can be accurately predicted, which facilitates the autonomous vehicle to avoid the pedestrian and insures driving safety.

Figure 5:
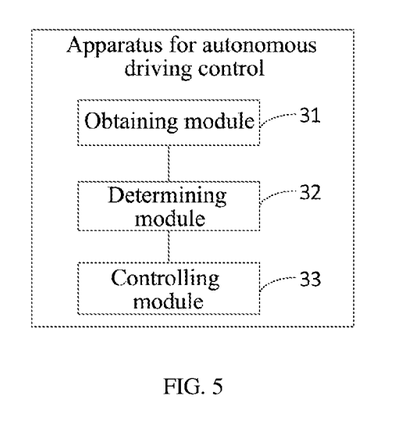
FIG. 5 is a schematic diagram of a third embodiment according to the present application.

FIG. 5 is a schematic diagram of a third embodiment according to the present application; as shown in FIG. 5, the apparatus in this embodiment may include:

an obtaining module 31, configured to obtain movement data of a pedestrian; where the movement data includes: a velocity component of the pedestrian along a width direction of a lane and a time of duration that the pedestrian cuts into a driving path of an autonomous vehicle from one side;

a determining module 32, configured to determine a movement direction of the pedestrian according to the movement data and movement information of the pedestrian;

a controlling module 33, configured to generate a driving strategy for the autonomous vehicle according to the movement direction of the pedestrian.

In the present embodiment, a movement direction of the pedestrian is determined through obtaining a velocity component of the pedestrian along the width direction of the lane, the time of duration that the pedestrian cuts into a driving path of the autonomous vehicle from the one side and movement information of the pedestrian; the driving strategy for the autonomous vehicle is generated according to the movement direction of the pedestrian. Therefore, it is possible to perform an accurate prediction for an instantaneous movement direction of the pedestrian and a determination of whether the pedestrian will cut into the driving trajectory of the autonomous vehicle from the one side, which facilitates the autonomous vehicle to choose a better driving strategy, to avoid the pedestrian, and to insure driving safety.

In a possible design, the obtaining module 31 is specifically configured to:

obtain a position of the lane where the pedestrian is located and a movement velocity of the pedestrian;

resolve the movement velocity of the pedestrian in accordance to an extension direction and a width direction of the lane to obtain a velocity component along the extension direction of the lane and a velocity component along the width direction of the lane; and determine the time of duration that the pedestrian cuts into the driving path of the autonomous vehicle from the one side according to the velocity component of the pedestrian along the width direction of the lane and the position of the lane where the pedestrian is located.

In this embodiment, by resolving the movement velocity of the pedestrian, the velocity component of the pedestrian along the extension direction of the lane and the velocity component of the pedestrian along the width direction of the lane are obtained; then, based on the position of the lane where the pedestrian is located, it is possible to accurately calculate the time of duration that the pedestrian cuts into the driving path of the autonomous vehicle from the one side. According to this time of duration, it is possible to determine the likelihood that the pedestrian will cut into the driving trajectory of the autonomous vehicle, thereby enabling the autonomous vehicle to make a better avoidance strategy and insuring driving safety.

In a possible design, the obtaining module 31 is further configured to:

capture an environmental image of surroundings of the autonomous vehicle;

extract lane information from the environmental image, where the lane information includes: positions of lane distribution, a lane width, and a lane direction; and determine the position of the lane where the pedestrian is located according to the lane information.

In this embodiment, the environmental image of the surroundings of the autonomous vehicle can be collected with an image collector (such as a camera) installed on the autonomous vehicle. Then, positions of lane distribution, a lane width, a lane direction, and other information are extracted from the environmental image, and with a combination of such information and the position where the pedestrian appears in the image, the position of the lane where the pedestrian is located is determined. Thereby, accurate positioning of the pedestrian can be realized, which facilitates the collection of the movement information of the pedestrian.

In a possible design, determining a time of duration that the pedestrian cuts into the driving path of the autonomous vehicle from one side according to the velocity component of the pedestrian along the width direction of the lane and the position of the lane where the pedestrian is located includes:

obtaining velocity components of the pedestrian along the width direction of the lane corresponding to multiple moments within a preset time period;

performing a smoothing processing on the velocity components of the pedestrian along the width direction of the lane corresponding to the multiple moments to obtain a smoothing processed velocity component; and determining the time of duration that the pedestrian cuts into the driving path of the autonomous vehicle from the one side according to the smoothing processed velocity component and the position of the lane where the pedestrian is located.

In the present embodiment, the smoothing processing is performed on the velocity components of the pedestrian along the width direction of the lane at the multiple moments in the preset time period to obtain the smoothing processed velocity component; then the time of duration that the pedestrian cuts into the driving path of the autonomous vehicle from the one side is determined according to the smoothing processed velocity component and the position of the lane where the pedestrian is located. In this way, it is possible to eliminate the disturbance caused by a body sway from left to right of the pedestrian within a preset period of time, making the collected information more accurate.

In a possible design, the movement information of the pedestrian includes: an average velocity of the pedestrian in the time of duration, a distance between the pedestrian and the autonomous vehicle, and a standard deviation of the movement velocity of the pedestrian.

In this embodiment, sufficient movement information of the pedestrian is obtained and then used as a basis for the decision so as to make the driving strategy generated by the autonomous vehicle more consistent with the actual road conditions and improve the effectiveness of the control strategy on the premise that driving safety is insured.

In a possible design, the determining module 32 is specifically configured to:

construct a decision tree model, where the decision tree model includes: a gradient boosted decision tree (GBDT) model;

input the movement data and the movement information of the pedestrian into the decision tree model, where the decision tree model outputs the movement direction of the pedestrian; where the movement direction of the pedestrian includes: the extension direction of the lane, the leftward direction for cutting into the lane and the rightward direction for cutting into the lane.

In the present embodiment, classification of the movement direction of the pedestrian is performed through the constructed decision tree model, and the most likely movement direction of the pedestrian is determined based on the movement data and the movement information of the pedestrian. As many factors are introduced into the decision tree model, the determination result of the movement direction can be made more accurate.

In a possible design, the controlling module 33 is specifically configured to:

generate the driving strategy for the autonomous vehicle according to the movement direction of the pedestrian, where the driving strategy includes: adjustment of a driving velocity and adjustment of a driving direction.

In the present embodiment, after the moving direction of the pedestrian is determined, the driving velocity and/or driving direction of the autonomous vehicle may be adjusted to insure the safety of the autonomous vehicle and the pedestrian.

In a possible design, the controlling module 33 is further configured to:

determine an avoidance strategy for the autonomous vehicle according to the movement direction of the pedestrian, driving information of the autonomous vehicle and the movement information of the pedestrian; where the driving information of the autonomous vehicle includes: a driving velocity of the autonomous vehicle, information about a position of the lane where the autonomous vehicle is located, and a distance between the autonomous vehicle and the pedestrian.

In the present embodiment, the avoidance strategy for the autonomous vehicle may be determined based on the comprehensive consideration of the movement direction of the pedestrian, driving information of the autonomous vehicle and the movement information of the pedestrian, so that on the premise of an insurance of the pedestrian safety and driving safety, the autonomous vehicle uses the best avoidance method and provides improved driving experience.

The apparatus for autonomous driving control of the present embodiment can implement the technical solutions in the methods shown in FIG. 2 and FIG. 4. For specific implementation processes and technical principles thereof, reference can be made to related descriptions in the methods shown in FIG. 2 and FIG. 4.

In the present embodiment, by means of obtaining movement data of the pedestrian, where the movement data includes a velocity component of the pedestrian along the width direction of the lane and the time of duration that the pedestrian cuts into a driving path of the autonomous vehicle from one side; determining a movement direction of the pedestrian according to the movement data and the movement information of the pedestrian; and generating the driving strategy for the autonomous vehicle according to the movement direction of the pedestrian, the movement direction of the pedestrian can be accurately predicted, which facilitates the autonomous vehicle to avoid the pedestrian and insures driving safety.

Figure 6:
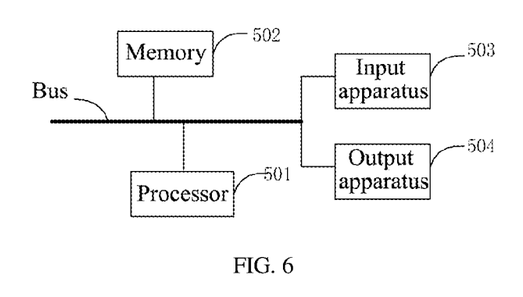
FIG. 6 is a block diagram of an electronic device for implementing the method for autonomous driving control according to an embodiment of the present application.

FIG. 6 is a block diagram of an electronic device for implementing the method for autonomous driving control according to an embodiment of the present application. The electronic device is intended to represent various forms of digital computers, such as laptop computers, desktop computers, workbenches, personal digital assistants, servers, blade servers, mainframe computers, and other suitable computers. The electronic device may also represent various forms of mobile devices, such as personal digital assistant, cellular phones, smart phones, wearable devices, and other similar computing apparatuses. The components, their connections and relationships, and their functions as shown herein are merely examples, and are not intended to limit the implementation of the application described and/or required herein.

As shown in FIG. 6, the electronic device includes: one or more processors 501, a memory 502, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output apparatus (such as a display device coupled to the interface). In other implementations, multiple processors and/or multiple buses can be used together with multiple memories, if desired. Similarly, multiple electronic devices can be connected, each providing some of the necessary operations (for example, as a server array, a group of blade servers, or a multiprocessor system). The one processor 501 is taken as an example in FIG. 6.

The memory 502 is a non-transitory computer-readable storage medium provided by the present application, and the memory stores instructions executable by at least one processor, so that the at least one processor executes the method for autonomous driving control of FIG. 6 provided in the present application. The non-transitory computer-readable storage medium of the present application stores computer instructions which are used to cause a computer to implement the method for autonomous driving control of FIG. 6 provided by the present application.

The memory 502 is a non-transitory computer-readable storage medium, and can be used to store non-transitory software programs, non-transitory computer executable programs, and modules, such as program instructions/modules corresponding to the method for autonomous driving control of FIG. 6 in the embodiment of the present application. The processor 501 implements various functional applications of the server and data processing, that is, the method for autonomous driving control of FIG. 6 in the above method embodiment by running the non-transitory software programs, instructions, and modules stored in the memory 502.

The memory 502 may include a storage program area and a storage data area, where the storage program area may store an operating system and an application program required by at least one function; the storage data area may store data established for use of an electronic device according to the method for autonomous driving control of FIG. 6 Created data, etc. In addition, the memory 502 may include a high-speed random access memory, and may further include a non-transitory memory, such as at least one magnetic disk storage device, a flash memory device, or other non-transitory solid-state storage device. In some embodiments, the memory 502 may optionally include a memory remotely set with respect to the processor 501, and these remote memories may be connected to the electronic device of the method for autonomous driving control of FIG. 6 through a network. Examples of the above network include, but are not limited to, the Internet, an intranet, a local area network, a mobile communication network, and combinations thereof.

The electronic device of the method for autonomous driving control of FIG. 6 may further include an input apparatus 503 and an output device 504. The processor 501, the memory 502, the input apparatus 503, and the output apparatus 504 may be connected through a bus or in other manners. In FIG. 6, the connection through the bus is taken as an example.

The input apparatus 503, such as a touch screen, a keypad, a mouse, a trackpad, a touchpad, pointing stick, one or more mouse buttons, trackball, joystick and other input apparatus, can receive inputted numeric or character information and generate key signal inputs related to user settings and function control of the electronic device of the method for the autonomous driving control of FIG. 6. The output apparatus 504 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and technologies described herein may be implemented in digital electronic circuitry systems, integrated circuit systems, application-specific ASICs (application-specific integrated circuits), computer hardware, firmware, software, and/or combinations thereof. These various embodiments may include: implemented in one or more computer programs that are executable and/or interpreted on a programmable system including at least one programmable processor, where the programmable processor may be a dedicated or general-purpose programmable processor that may receive data and instructions from a storage system, at least one input apparatus, and at least one output apparatus, and transmit the data and instructions to the storage system, the at least one input apparatus, and the at least one output apparatus.

These computing programs (also known as programs, software, software applications, or code) include machine instructions of a programmable processor and can be implemented using high-level procedures and/or object-oriented programming languages, and/or assembly/machine languages As used herein, the terms "machine-readable medium" and "computer-readable medium" refer to any computer program product, device, and/or apparatus (For example, magnetic disks, optical disks, memories, programmable logic devices (PLDs) used to provide machine instructions and/or data to a programmable processor, and include machine-readable medium that receives machine instructions as machine-readable signals. The term "machine-readable signal" refers to any signal used to provide machine instructions and/or data to a programmable processor.

To provide interaction with the user, the systems and techniques described herein can be implemented on a computer that has: a display apparatus (for example, a CRT (cathode ray tube) or LCD (liquid crystal display) monitor) for displaying information to the user; and a keyboard and pointing apparatus (such as a mouse or trackball) through which the user can provide input to the computer. Other kinds of apparatuses may also be used to provide interaction with the user; for example, the feedback provided to the user may be any form of sensory feedback (e.g., visual feedback, auditory feedback, or haptic feedback); and the input may be received in any form (including acoustic input, voice input, or tactile input) from the user.

The systems and technologies described herein may be implemented in a computing system including back-end components (e.g., as a data server), or a computing system including middleware components (e.g., an application server), or a computing system including front-end components (for example, a user computer with a graphical user interface or web browser, through which the user can interact with implementations of the systems and technologies described herein, or a computing system including any combination of such back-end components, middleware components, or front-end components. The components of the system may be interconnected by any form or medium of digital data communication (e.g., a communication network). Examples of communication networks include: local area network (LAN), wide area network (WAN), and the Internet.

The computer system may include a client and a server. The client and the server are generally remote from each other and typically interact through a communication network. The client-server relationship is generated by computer programs running on the corresponding computers and having a client-server relationship with each other.

It should be understood that the various forms of processes shown above can be used, and the steps can be reordered, added, or deleted. For example, the steps described in the present application can be executed in parallel, sequentially, or in different orders, as long as the desired results of the technical solutions disclosed in this application can be achieved, and there is no limitation thereto.

The foregoing specific embodiments do not constitute a limitation on the protection scope of the present application. It should be understood by those skilled in the art that various modifications, combinations, sub-combinations, and substitutions may be made according to design requirements and other factors. Any modification, equivalent substitutions and improvement made within the spirit and principle of the present application shall be included in the protection scope of this application.

What is claimed is:
1. A method for autonomous driving control, comprising:
   obtaining, by a processor, movement data of a pedestrian;
      wherein the movement data comprises: a velocity component of the pedestrian along a width direction of a lane and a time of duration that the pedestrian cuts into a driving path of an autonomous vehicle from one side, wherein, the time of duration that the pedestrian cuts into the driving path of the autonomous vehicle from one side indicates a likelihood that the pedestrian will intrude into the driving path of the autonomous vehicle;
   determining, by the processor, a movement direction of the pedestrian according to the movement data and movement information of the pedestrian;
   generating, by the processor, a driving strategy for the autonomous vehicle according to the movement direction of the pedestrian; and
   controlling, by the processor, driving of the autonomous vehicle according to the driving strategy;
   wherein the obtaining, by the processor, movement data of the pedestrian comprises:
   obtaining, by the processor, a position of the lane where the pedestrian is located and the movement velocity of the pedestrian;
   resolving, by the processor, the movement velocity of the pedestrian in accordance to an extension direction and the width direction of the lane to obtain a velocity component along the extension direction of the lane and the velocity component along the width direction of the lane; and
   determining, by the processor, the time of duration that the pedestrian cuts into the driving path of the autonomous vehicle from the one side according to the velocity component of the pedestrian along the width direction of the lane and the position of the lane where the pedestrian is located;
   wherein the time of duration refers to a time of duration of keeping the movement velocity for cutting into the driving path of the autonomous vehicle from one side non-zero.
2. The method according to claim 1, wherein the obtaining, by the processor, the position of the lane where the pedestrian is located comprises:
   capturing, by the processor, an environmental image of surroundings of the autonomous vehicle;

extracting, by the processor, lane information from the environmental image, wherein the lane information comprises: positions of lane distribution, a lane width, and a lane direction; and determining, by the processor, the position of the lane where the pedestrian is located according to the lane information.

3. The method according to claim 1, wherein the determining, by the processor, the time of duration that the pedestrian cuts into the driving path of the autonomous vehicle from the one side according to the velocity component of the pedestrian along the width direction of the lane and the position of the lane where the pedestrian is located comprises:

obtaining, by the processor, velocity components of the pedestrian along the width direction of the lane corresponding to multiple moments within a preset time period;

performing, by the processor, a smoothing processing on the velocity components of the pedestrian along the width direction of the lane corresponding to the multiple moments to obtain a smoothing processed velocity component; and determining, by the processor, the time of duration that the pedestrian cuts into the driving path of the autonomous vehicle from the one side according to the smoothing processed velocity component and the position of the lane where the pedestrian is located.

4. The method according to claim 3, wherein the movement information of the pedestrian comprises: an average velocity of the pedestrian in the time of duration, a distance between the pedestrian and the autonomous vehicle, and a standard deviation of the movement velocity of the pedestrian.

5. The method according to claim 1, wherein the determining, by the processor, the movement direction of the pedestrian according to the movement data and movement information of the pedestrian comprises:

constructing, by the processor, a decision tree model, wherein the decision tree model comprises: a gradient boosted decision tree (GBDT) model; and inputting, by the processor, the movement data and the movement information of the pedestrian into the decision tree model, wherein the decision tree model outputs the movement direction of the pedestrian; wherein the movement direction of the pedestrian comprises: an extension direction of the lane, a leftward direction for cutting into the lane and a rightward direction for cutting into the lane.

6. The method according to claim 1, wherein the generating, by the processor, the driving strategy for the autonomous vehicle according to the movement direction of the pedestrian comprises:

generating, by the processor, the driving strategy for the autonomous vehicle according to the movement direction of the pedestrian, wherein the driving strategy comprises: adjustment of a driving velocity and adjustment of a driving direction.

7. The method according to claim 1, wherein the method further comprises:

determining, by the processor, an avoidance strategy for the autonomous vehicle according to the movement direction of the pedestrian, driving information of the autonomous vehicle and the movement information of the pedestrian; wherein the driving information of the autonomous vehicle comprises: a driving velocity of the autonomous vehicle, information about a position of the lane where the autonomous vehicle is located, and a distance between the autonomous vehicle and the pedestrian; and controlling, by the processor, driving of the autonomous vehicle according to the avoidance strategy.

8. An electronic device, comprising:

at least one processor; and a memory connected in communication with the at least one processor; wherein the memory stores instructions executable by the at least one processor, and the instructions are executed by the at least one processor to enable the at least one processor to:

obtain movement data of a pedestrian; wherein the movement data comprises: a velocity component of the pedestrian along a width direction of a lane and a time of duration that the pedestrian cuts into a driving path of an autonomous vehicle from one side, wherein, the time of duration that the pedestrian cuts into the driving path of the autonomous vehicle from one side indicates a likelihood that the pedestrian will intrude into the driving path of the autonomous vehicle;

determine a movement direction of the pedestrian according to the movement data and movement information of the pedestrian;

generate a driving strategy for the autonomous vehicle according to the movement direction of the pedestrian; and control driving of the autonomous vehicle according to the driving strategy;

wherein the at least one processor is further enabled to:

obtain a position of the lane where the pedestrian is located and the movement velocity of the pedestrian;

resolve the movement velocity of the pedestrian in accordance to an extension direction and the width direction of the lane to obtain a velocity component along the extension direction of the lane and the velocity component along the width direction of the lane; and determine the time of duration that the pedestrian cuts into the driving path of the autonomous vehicle from the one side according to the velocity component of the pedestrian along the width direction of the lane and the position of the lane where the pedestrian is located;

wherein the time of duration refers to a time of duration of keeping the movement velocity for cutting into the driving path of the autonomous vehicle from one side non-zero.

9. The device according to claim 8, wherein the at least one processor is further enabled to:

capture an environmental image of surroundings of the autonomous vehicle;

extract lane information from the environmental image, wherein the lane information comprises: positions of lane distribution, a lane width, and a lane direction; and determine the position of the lane where the pedestrian is located according to the lane information.

10. The device according to claim 8, wherein the at least one processor is further enabled to:

obtain velocity components of the pedestrian along the width direction of the lane corresponding to multiple moments within a preset time period;

perform a smoothing processing on the velocity components of the pedestrian along the width direction of the lane corresponding to the multiple moments to obtain a smoothing processed velocity component; and determine the time of duration that the pedestrian cuts into the driving path of the autonomous vehicle from the one side according to the smoothing processed velocity component and the position of the lane where the pedestrian is located.

11. The device according to claim 10, wherein the movement information of the pedestrian comprises: an average velocity of the pedestrian in the time of duration, a distance between the pedestrian and the autonomous vehicle, and a standard deviation of the movement velocity of the pedestrian.

12. The device according to claim 8, wherein the at least one processor is further enabled to:
   construct a decision tree model, wherein the decision tree model comprises: a gradient boosted decision tree (GBDT) model; and
   input the movement data and the movement information of the pedestrian into the decision tree model, wherein the decision tree model outputs the movement direction of the pedestrian; wherein the movement direction of the pedestrian comprises: an extension direction of the lane, a leftward direction for cutting into the lane and a rightward direction for cutting into the lane.

13. The device according to claim 8, wherein the at least one processor is further enabled to generate the driving strategy for the autonomous vehicle according to the movement direction of the pedestrian, wherein the driving strategy comprises: adjustment of a driving velocity and adjustment of a driving direction.

14. A non-transitory computer readable storage medium storing computer instructions, wherein the computer instructions are used to cause a computer to execute the method according to claim 1.

* * * * *